US010783647B2

(12) United States Patent
Anantha et al.

(10) Patent No.: US 10,783,647 B2
(45) Date of Patent: Sep. 22, 2020

(54) REAL-TIME OBJECT TRACKING

(71) Applicant: Cisco Technology, Inc., San Jose, CA (US)

(72) Inventors: Swaminathan A. Anantha, Mountain View, CA (US); Mickael J. Graham, Sydney (AU)

(73) Assignee: Cisco Technology, Inc., San Jose, CA (US)

(*) Notice: Subject to any disclaimer, the term of this patent is extended or adjusted under 35 U.S.C. 154(b) by 137 days.

(21) Appl. No.: 15/988,860

(22) Filed: May 24, 2018

(65) Prior Publication Data

US 2019/0362508 A1    Nov. 28, 2019

(51) Int. Cl.
| H04W 36/32 | (2009.01) |
| G06T 7/292 | (2017.01) |
| H04W 72/04 | (2009.01) |
| H04W 36/38 | (2009.01) |
| G01S 17/10 | (2020.01) |
| G01S 17/86 | (2020.01) |

(52) U.S. Cl.
CPC ............. *G06T 7/292* (2017.01); *H04W 36/38* (2013.01); *H04W 72/0433* (2013.01); *H04W 72/0486* (2013.01); *G01S 17/10* (2013.01); *G01S 17/86* (2020.01)

(58) Field of Classification Search
CPC ....... G01S 17/023; G01S 17/10; G06T 7/292; H04W 36/38; H04W 72/0433; H04W 72/0486
See application file for complete search history.

(56) References Cited

U.S. PATENT DOCUMENTS

| 8,750,895 | B2 | 6/2014 | Grosman et al. | |
| 10,176,379 | B1* | 1/2019 | Barton | G06K 9/00671 |
| 2007/0257985 | A1 | 11/2007 | Estevez et al. | |
| 2008/0242305 | A1* | 10/2008 | Kahlert | H04W 36/32 |
| | | | | 455/440 |
| 2015/0237481 | A1* | 8/2015 | Ben-Moshe | G01S 1/70 |
| | | | | 455/456.1 |

(Continued)

OTHER PUBLICATIONS

He et al. "Probabilistic Multi-Sensor Fusion Based Indoor Positioning System on a Mobile Device", Published Online Dec. 14, 2015, 6 pages.

(Continued)

*Primary Examiner* — Said M Elnoubi
(74) *Attorney, Agent, or Firm* — Patterson + Sheridan, LLP

(57) ABSTRACT

The present disclosure provides improved determinism in systems and methods for wireless communications via real-time visual object tracking using radio, video, and range finding. In one example, a first and a second Access Point (AP) in a constellation in which the APs are positioned at knowns position in the environment, and the APs perform image processing to identify an entity the environment based on captured images and an entity definition. The APs receive, via range finders, ranges between the entity and the first and second APs to determine a location of the entity in the environment. The APs may then create a profile for the entity that includes an entity identifier, the location of the entity, and indicates whether one of the first AP and the second AP is in wireless communication with the entity.

18 Claims, 9 Drawing Sheets

(56) References Cited

U.S. PATENT DOCUMENTS

| 2016/0127926 | A1* | 5/2016 | Xie | H04W 16/22 |
|---|---|---|---|---|
| | | | | 455/67.7 |
| 2017/0124476 | A1* | 5/2017 | Levinson | G05D 1/0088 |
| 2018/0067187 | A1* | 3/2018 | Oh | H04W 64/00 |
| 2019/0096113 | A1* | 3/2019 | Stukalov | G06T 11/60 |

OTHER PUBLICATIONS

Correa et al. "Room-Level Wi-Fi Location Tracking," Carnegie Mellon Silicon Valley, Jan. 2, 2009, 12 pages.

Domingo et al. "Indoor Positioning System Using Depth Maps and Wireless Networks" Hindawi, Journal of Sensors, vol. 2016, Article ID 2107872, 8 pages.

Aruba Airwave Visualrf, "Network-Wide Visibility and Location Mapping," 3 pages. [accessed online] www.arubanetworks.com.

Piva et al. "Video and Radio Attributes Extraction for Heterogeneous Location Estimation in a Context-Based Ambient Intelligence Architecture," Department of Biophysical and Electronical Engineering—University of Genova, 28 pages.

Miyaki et al. "Multi-Sensor Fusion Tracking Using Visual Information and Wi-Fi Location Estimation" IEEE, Sep. 25-28, 207, 7 pages.

* cited by examiner

REAL-TIME OBJECT TRACKING

TECHNICAL FIELD

Embodiments presented in this disclosure generally relate to wireless Access Points (AP) that track objects within an environment.

BACKGROUND

In various environments that provide wireless connectivity, entities within those environments, such as persons, robots, furniture, etc. may use various devices to send and receive signals between one another and various Access Points (AP) that act as intermediaries or links to wired networks. These entities may be mobile or static within the environment, and in environments where multiple entities send and receive data wirelessly, the entities may be served by multiple APs that handover services for the entities based on the serving capabilities of the APs and the signal health between a given AP and a given entity. In one example, a user moves a mobile device from room to room within an office and desires to maintain Wi-Fi connectivity. In a second example, consumer goods may be tagged with Radio Frequency Identifier (RFID) chips and tracked as the goods are moved about a warehouse or shipping center. In a third example, a user may move a Bluetooth enabled device about a domicile. In each of the above examples, if multiple APs are present in the environment, the entity may be served by one or more of the APs, and service for a given entity may transition from a first AP to a second AP when the first AP reaches a capacity of entities to serve or a Signal-to-Noise Ratio (SNR) between the first AP and the given entity drops below a threshold. The handover preserves connectivity for the given entity, but uses processing resources for the AP, and may temporarily lower the bandwidth or connection speed available to the given entity.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
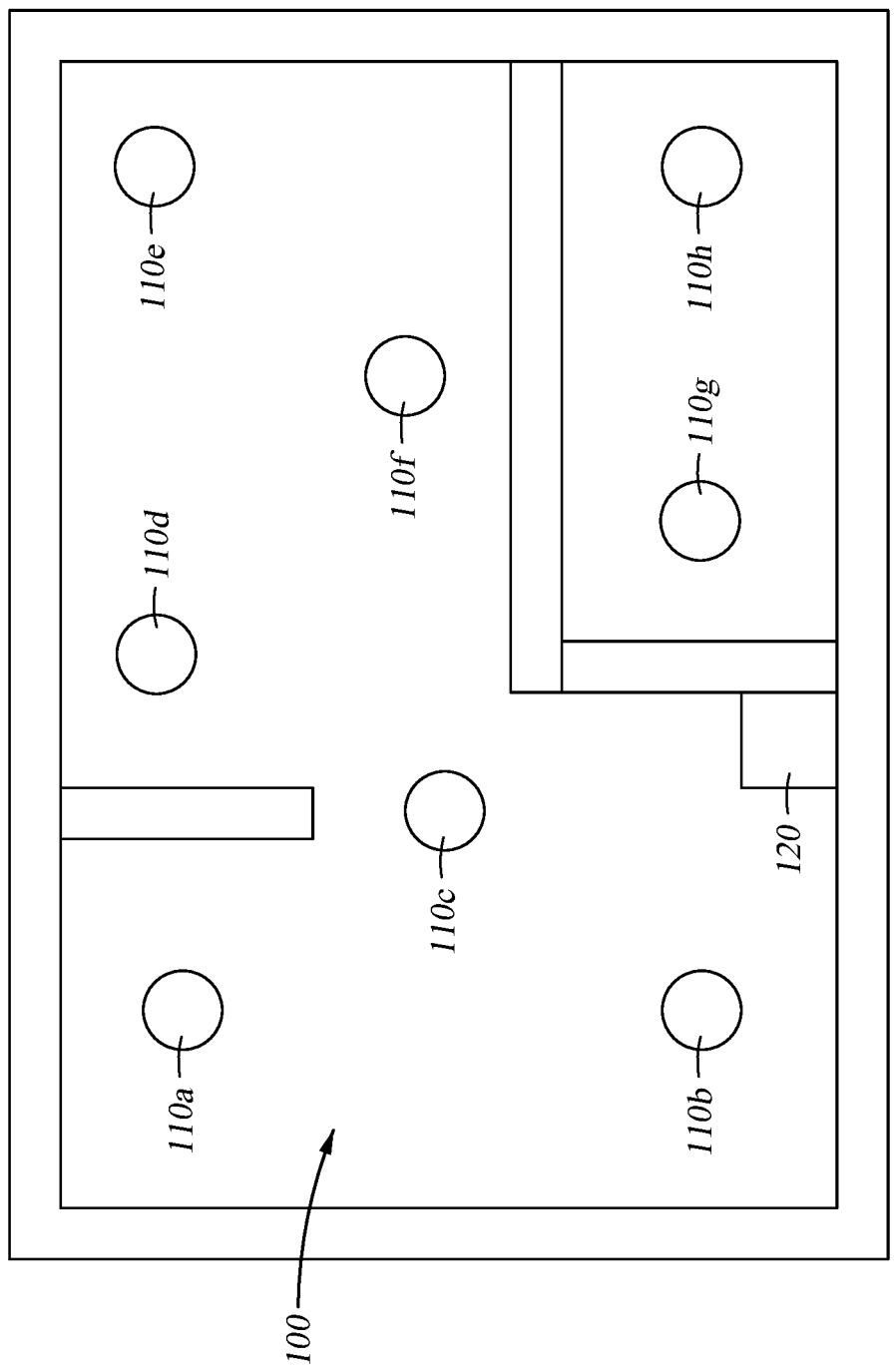
FIG. 1 illustrates a top-down schematic view of an environment in which several Access Points are deployed in a constellation to serve entities within the environment with wireless communications according to aspects of the present disclosure.

One embodiment presented in this disclosure provides a system, comprising: a first Access Point (AP), including: a first camera sensor, configured to identify an entity via a first image of the environment and a plurality of entity definitions; a first range finder sensor, configured to determine a range between the entity and the first AP; and a first radio, configured to establish wireless communication with the entity; a second AP, including: a second camera sensor, configured to identify the entity via a second image of the environment and the plurality of entity definitions; a second range finder sensor, configured to determine a second range between the entity and the second AP; and a second radio, configured to establish wireless communications with the entity; and a controller, configured to: determine a location of the entity in the environment based on the first range, the second range, a position of the first AP in the environment, and a position of the second AP in the environment; and provision wireless communication of the first AP and the second AP according to the identified entity and the location of the entity in the environment.

Another embodiment presented in this disclosure provides a method, comprising: identifying a first Access Point (AP) and a second AP in a constellation within an environment, wherein the first AP is positioned at a first known position in the environment, and wherein the second AP is positioned at a second known position in the environment; performing image processing to identify an entity in a captured image of the environment based on an entity definition; receiving, via range finders, a first range between the entity and the first AP and a second range between the entity and the second AP; determining a location of the entity in the environment based on the first range, the second range, the first known position, and the second known position; and creating a profile for the entity that includes an entity identifier, the location of the entity, and indicates whether one of the first AP and the second AP is in wireless communication with the entity.

A further embodiment presented in this disclosure provides a first Access Point (AP), comprising: a radio sensor, configured to establish wireless communications with a signal source and determine a first plurality of distances to the signal source relative to a first known position of the system within an environment over a period of time; a camera sensor, configured to capture sequential images of the environment over the period of time and identify an entity within the sequential images; a range finder sensor, configured to determine a plurality of ranges to an object within the environment over the period of time, wherein the object is identified as the entity from the sequential images; a network interface, configured to communicate with a second AP in the environment to receive a second plurality of distances to the signal source relative to a second known position of the second AP within the environment; a processor; and a memory, including instructions that when executed by the processor cause the processor to: determine a location of the entity in the environment based on the first plurality of ranges, the second plurality of ranges, the first known position, and the second known position; and provision wireless communication to the identified entity based on the location of the entity in the environment.

Example Embodiments

The present disclosure provides systems and methods for improving determinism for wireless networks via real-time object tracking using radio, video, and range finding. By using several methodologies of object identification (e.g., WiFi, Video, Lidar), an Access Point (AP)—or collection of APs; referred to as a constellation—may develop profiles for the various entities in the environment, and track those entities as objects having distinct properties. Tracking the entities within the environment may allow for a constellation of APs to preemptively handover service for entities to balance loads between individual APs (e.g., freeing capacity before an entity enters a service range of a particular AP), determine candidate entities to keep capacity available for (e.g., a laptop computer that is not yet connected to WiFi may have capacity reserved for a later connection), or communicate with the entities as associated locations in the environment change (e.g., alerting an entity entering a restricted space, tracking products in a warehouse, navigating an entity within a space).

FIG. 1 illustrates a top-down schematic view of an environment 100 in which several APs 110a-h (generally AP 110) are deployed in a constellation to serve entities within the environment 100 with wireless communications. Although eight APs 110 are illustrated in the example embodiment, more or fewer APs 110 may be used in other embodiments. In addition to the APs 110, a controller 120 may optionally be included in the constellation. Each AP 110 and the optional controller 120 are computing devices that include processors and memory storage devices, the hardware of which is discussed in greater detail in regard to FIG. 2.

The environment 100 refers to the spaces (and surrounding areas) in which a plurality of APs 110 are deployed in concert to provide wireless communications to various user devices (i.e., as a constellation). Example environments 100 include buildings, ships, campuses, and the like.

The APs 110 are illustrated at various positions in the environment 100, and may be set so that the signal ranges of several APs 110 overlap, thus allowing for handover of service between different APs 110 for various entities moving within the environment 100. APs 110 may be mounted to the ceiling, walls, or other architectural features within the environment to provide wireless connectivity to the various entities within the environment 100 at set points. Additionally, APs 110 may be provisioned on semi-permanent or mobile features in the environment 100, such as, for example, vehicles, carts, kiosks and other moveable features. Certain APs 110 may be provisioned according to architectural divisions or to account for signal degradation or crosstalk within the environment 100. For example, AP 110g and AP 110f may be provisioned within a room in the environment to provide wireless access within the room to account for increased demand within the room or reduced signal strength from APs 110 outside of the room. For example, the APs 110 can be provisioned as part of a constellation to account for signal characteristics and localized load demand within an environment 100.

Each AP 110 in the constellation may be active or inactive, and may include or activate some or all of the sensors described herein. For example, a first AP 110 may be active, and serve several entities, while a second AP 110b may be inactive and not serve any entities at a given time, such as, for example, when the second AP 110b is provided as a back-up or load balancing AP 110 for use during conditions where a primary AP 110 is inactive or otherwise incapable of handling the load from the entities within a service range. In another example, a first AP 110a may include various radio systems for wireless communication and video systems, but may not include range finding functionality, whereas a second AP 110b may include various radio systems for wireless communication and range finding systems, but not include video functionality. In yet another example, a given AP 110 may include radio systems, video systems, and range finding systems, but may only sporadically activate one or more of the systems, such as, for example, a video system may be inactive until a radio system or the range finding system indicates that an entity is entering the service range for the given AP 110.

In one embodiment, a given AP 110 is associated with various service capacities. For example, a given AP 110 may not be able to serve more than d devices at a time, and if a $(d+1)^{th}$ device attempts to connect with the given AP 110, one or more devices may be handed over to another AP 110 or the $(d+1)^{th}$ device may be denied a connection to the given AP 110. In another example, a given AP 110 may have a capacity predicated on the bandwidth of connection speed allocated to various entities. For example, with d devices connected to a given AP 110, each device may be allocated up to x/d of the bandwidth of a wired connection (with available bandwidth x) available to the given AP 110, but if the allocated bandwidth x/d falls below a threshold or a particular devices requests more than x/d bandwidth, one or more devices may be handed over to a different AP 110 regardless of whether the given AP 110 is capable of connecting with more than d devices. In another example, an AP 110 may have a service capacity for a given device based on the Signal-to-Noise Ratio (SNR), signal amplitude, or other measure of signal health received from the given device, and may seek to handover the given device to another AP 110 (or drop the connection with the given device) in response to the measure of signal health dropping below a threshold.

Within a constellation, balancing the service characteristics of the individual APs 110 may be done ad hoc, between the various APs 110, or may be managed by a controller 120 in a centralized manner. A controller 120 may be an AP 110 designated as a master AP 110 within the constellation, or may be a separate computing device that coordinates the activities of one or more APs 110. In some embodiments, a controller 120 may be localized to a subset of the APs 110 in the constellation and is in communication with additional controllers 120 to balance the service characteristics between localized subsets of the APs 110, or may in turn be in communication with a super controller 120 that manages several localized controllers 120. For example, a first controller 120 may manage APs 110a-f, while a second controller 120 may manage APs 110 g-h, and a third controller 120 may coordinate the first and second controllers 120.

In addition to the potential for providing centralized control, a controller 120 may provide shared storage space and/or processing power accessible by two or more APs 110.

For example, the APs 110 may access to controller 120 to receive various definitions or primitives for entity classifications. In another example, the APs 110 may store entity profiles on the controller 120 to share profiles between various APs 110. In a further example, data collected by the APs 110 may be transmitted to the controller 120 for processing, and the determinations on how to act on the collected data may be transmitted from the controller 120 to the various APs 110.

Figure 2:
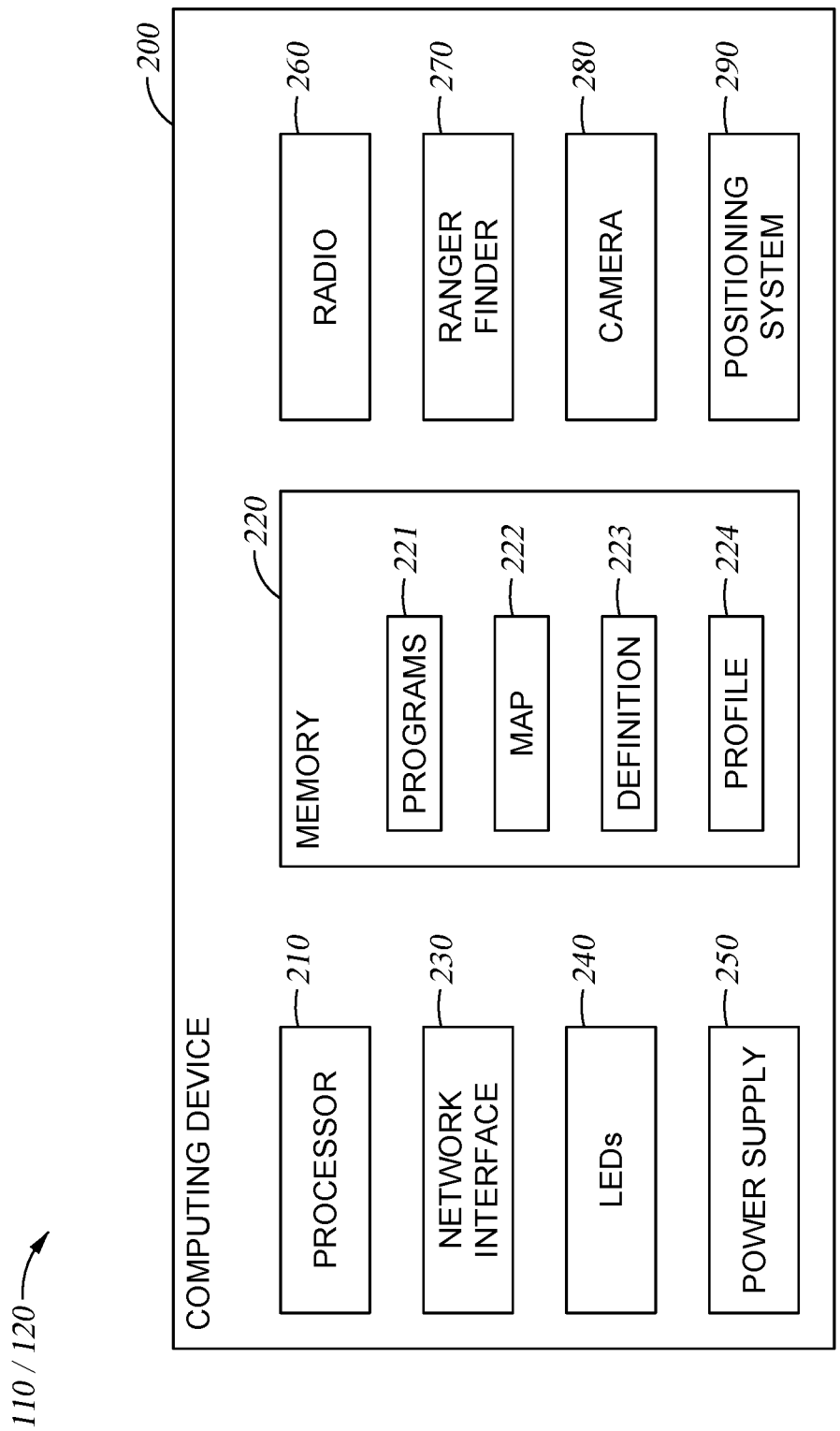
FIG. 2 illustrates example hardware of a computing device, such as an Access Point, a controller, or a device in wireless communication with an Access Point according to aspects of the present disclosure.

FIG. 2 illustrates example hardware of a computing device 200, such as an AP 110, a controller 120, or a device in wireless communication with an AP 110. Each of the AP 110, controller 120, or connected devices, may include all or a portion of the elements discussed in the present disclosure, and may include one or more instances of the discussed elements, and may include elements in addition to those discussed. One of ordinary skill in the art will appreciate that the elements discussed herein are provided for purposes of illustration and example, and are not limiting of the elements that a computing device 200 may include.

A computing device 200 includes a processor 210 and a memory 220. The processor 210 may be any computer processor capable of performing the functions described herein. Although memory 220 is shown as a single entity, memory 200 may include one or more memory devices having blocks of memory associated with physical addresses, such as Random Access Memory (RAM), Read Only Memory (ROM), flash memory or other types of volatile and/or non-volatile memory. The memory 220 includes one or more programs 221, map 222, entity definitions 223, and entity profiles 224.

The programs 221 include sets of instructions that are executable by the processor 210 to perform the various actions described in the present disclosure as well as to perform various functions that are not described in detail herein (so as not to distract from the concepts presented herein), but will be familiar to those who are of ordinary skill in the art.

The maps 222 may include one or more three-dimensional representations of an environment 100 in which an AP 110 is disposed. The maps 222 may be specific to a given AP 110 or may be shared among several APs 110 within a constellation or a portion of a constellation. For example, a map 222 for a given AP 110 may indicate the space visible to that given AP 110, whereas a shared map 222 may indicate spaces within an environment 100 that are not visible to the given AP 110 (e.g., space on a different floor) but may be visible to other APs 110 within the constellation. Each AP 110 may create or update the maps 222 stored in the memory 220, or receive an externally created or updated map 222. For example, a map 222 may be created/updated every night at a time when no entities beyond permanent (or semi-permanent) entities are present (e.g., walls, floors, furniture, plants). An up-to-date map 222 of the environment 100 allows an AP 110 to distinguish temporary/mobile entities from permanent/semi-permanent entities in the environment 100 and account for re-layouts of the environment 100 (e.g., a sofa is moved, a new shelf is installed, a plant grows).

The maps 222 may also include one or more two-dimensional representations of the environment in which an AP 110 is disposed. For example, an image of the environment 100 may be taken at a time when no entities are present in the environment 100, so that a given AP 110 may visually identify various entities in images of the environments 100 by comparing the image to the map 222 and noting any differences between the image and the map 222 as potential entities in the environment.

The maps 222 may be automatically updated at a predefined interval at times when transient entities are not expected to be in the environment 100 (e.g., at night, on weekends). In other embodiments, the maps 222 are manually updated (e.g., a user provides a new map 222 or signals the computing device 200 to generate a new map 222 using associated sensors). In further embodiments, the maps 222 are continuously updated such that entities or objects seen over long periods of time are classified as permanent features of the environment 100, and entities seen over shorter periods of time are classified as transient features within the environment 100.

The map 222 includes or incorporates a coordinate system to indicate the positions of the APs 110 within an environment 100 and the locations of the various entities identified within the environment 100. The positions of APs 110 within the environment 100 may be manually indicated on the map 222 during constellation deployment, or the APs 110 discover one another as permanent entities within the environment 100 to be included in the map 222. In various embodiments, the coordinate system is normalized with an existing coordinate system or is a coordinate system particular to the environment 100. For example, a coordinate system for an airport (or other static environment 100) may use latitude and longitude, whereas a coordinate system for a cruise ship (or other mobile environment 100) may use an X-Y coordinate system particular to the layout of the decks of the cruise ship.

The definitions 223 may provide various visual archetypes for the image processing of various still or video images of the environment 100 to identify types and subtypes of entities seen therein. For example, a definition 223 may be used to identify a person within the environment 100 in various positions (e.g., sitting, standing, lying down). In another example, a definition may be used to identify subtypes of persons within the environment 100 (e.g., men/women, young/old, dressed professionally/casually/in-uniform). In a further example, a definition 223 may be used to identify various entities such as animals, shopping carts, golf carts, wheelchairs, wagons, luggage, computing devices 200 (including APs 110 and other devices), furniture, plants, windows, mirrors, etc. In various embodiments, entities identified as reflective (e.g., windows, mirrors, floors) may be processed via an image mask so as to exclude reflections from being identified as entities.

The definitions 223 may provide various cues or ideals that an image may be analyzed to determine whether an entity satisfies the definition. For example, to determine whether an entity satisfies a "person: standing, male, uniformed" definition 223, the image may be analyzed to determine whether the candidate entity falls within a given size range, evidences particular colors (corresponding to persons and/or a known uniform), evidences particular proportions, and evidences particular shapes/outlines. An entity may satisfy zero to several definitions 223 of a plurality of definitions 223 available, and any satisfied definitions 223 may be associated with the entity in a profiles 224. The definitions 223 that a given entity satisfies may change over time (e.g., a sitting person stands up, a misidentified entity is properly identified) and the associated profile 224 may be updated accordingly.

The profiles 224 are created for various entities identified in the environment 100 to coordinate the storage of information related to the entity. A profile 244 for a given entity may include information related to: an entity identifier, a location in the environment 100 associated with the entity, a vector indicating several locations over a period of time that the entity has been identified in the environment 100 or is projected to be in the environment at a future time, a signal source profile of any signal generating devices associated with the entity, the definitions 223 that the entity has been determined to satisfy, which APs 110 (if any) are currently or have previously provided wireless connectivity to the entity, whether the entity is currently or has been previously been associated with another entity (e.g., two persons walking together, a laptop computer used by a person), etc. Data stored in a profile 224 associated with an entity may be periodically updated, built upon, or deleted according to the parameters of the computing device 200. For example, a profile associated with a forklift (and the operator) may associated various pallets of goods (e.g., via RFID tag) that are collected by the forklift, and may disassociate those pallets of goods from the forklift once the forklift enters a drop off zone or the pallets are otherwise associated with another entity.

The network interface 230 may include hardware interfaces for at least one of wired and wireless network management. In a first example, an AP 110 may include network interfaces 230 for managing wireless communications with connected devices and for managing wired communications between APs 110 and controllers 120 and/or external devices and networks (e.g., the Internet). In a second example, a controller 120 or external device (e.g., a local server, a networked resource) may include a wired network interface 230 for communicating via a wired network (including electrical and optical networks) with other devices connected to the wired network. In a third example, a connected device, such as a cellphone, may include a wireless network interface 230 to communicate wirelessly with the APs 110, but omit or disable a wired network interface 230.

Various Light Emitting Diodes (LED) 240, and power supplies 250 may also be included in a computing device 200. The LEDs 240 may communicate various statuses of and information related to the computing device 200 via patterns of operation (e.g., steady on/off, blinking, long/short blink patterns), colors, and combinations thereof. The power supply 250 provides electrical power to operate the computing device 200. The power supply 250 may include alternating current (AC) or direct current (DC) power supplies 250 and hardware to convert power to or from AC/DC, to condition the power, and to adjust the current, frequency, and/or voltage that is supplied to the computing device 200. Examples of power supplies 250 include, but are not limited to: batteries, solar cells, electrical cords connected to external power supplies, etc.

The illustrated computing device 220 includes a radio sensor 260, a range finder sensor 270, and a camera sensor 280, which are collectively referred to as "the sensors". An individual computing device 200 may include or exclude any of the components described as sensors herein, or may use those components differently than as discussed herein in relation to an AP 110. For example, a connected device (such as a laptop computer or cell phone) may include a camera, but not use that camera as a camera sensor 280 as described herein. One of ordinary skill in the art will therefore understand that the mere inclusion of a system that may be classified as one of a radio, a range finder, or a camera does not necessarily describe a sensor that may be used by an AP 110 for real-time object tracking.

The radio sensor 260 includes hardware and firmware to manage wireless connectivity according to one or more standards between the computing device 200 and one or more other devices. For example, where the computing device is an AP 110, several radio sensors 260 may be used to establish wireless communication sessions with several cellphones, laptops, and other wirelessly enabled devices. As used herein, radio refers to various wireless local area network communication standards developed under IEEE 802.11 (e.g., WiFi), offshoots thereof, as well as other communication standards (Bluetooth or IEEE 802.15, Radio Frequency Identification (RFID), etc.) that the various devices use to communicate wirelessly with APs.

In addition to providing wireless connectivity, the radio sensor 260 is configured to determine a distance between the computing device 200 and a signal source relative to the radio sensor 260. For example, the radio sensor 260 may use timestamps in received signals against a system clock, time offsets from scheduled broadcasts, signal strength analysis, or transmitter-included positional information, in different embodiments to determine a distance between the signal source and the computing device 200. For a constellation with at least two AP 110 at known positions in the environment 100, a location of a signal source may be determined when at least two distances to the entity are determined by the at least two AP 110.

The range finder sensor 270 may include a LiDAR sensor, or similar range finding device (such as sonar, radar, or depth sensing camera) that is part of a computing device 200 used as an AP 110. Range finding, as used herein, refers to various object detection systems and methods, such as LiDAR, which uses pulsed laser light to detect ranges to various objects from a known point. The discussed LiDAR elements may be freely substituted for or supplemented with other range finding systems and methods, such as sonar (using sound waves), radar (using radio waves), or depth perception cameras, based on environmental conditions.

The range finder sensor 270 may be activated periodically (i.e., at a scheduled time interval), in response to a radio sensor 260 detecting a previously undetected signal source, in response to a camera sensor 280 detecting an entity in the environment 100, in response to a camera sensor 280 detecting motion, in response to a command or request received from another AP 110 or a controller 120, and combinations thereof. The range finder sensor 270 emits a signal (e.g., a laser pulse) and measures an amount of time for that signal to be reflected back to the range finder sensor 270 to determine a range to a point in the environment 100. In various embodiments, the range finder sensor 270 scans the environment 100 to determine ranges to entities therein, while in other embodiments the range finder sensor 270 is directed to specific positions in the environment 100 based on entities identified by a camera sensor 280, a previously determined location of an entity in the environment 100, a location determined by two or more radio sensor 260, or a position in the environment suggested by one or more other range finder sensors 270 (e.g., associated with a different AP 110). A controller 120 or an AP 110 may use the ranges to an entity from a two or more APs 110 at known positions in the environment 100 to determine a location for an entity in the environment 100.

The camera sensor 280 includes a camera (still or video) that captures one or a series of images over a period of time and image recognition logic to identify entities in images of the environment 100. Video may include images captured using light in the visible spectrum or outside of the visible spectrum (e.g., microwave, infrared, ultraviolet) at various frame rates (e.g., 60 frames per second (FPS), 1 FPS, 0.25 FPS) that may remain constant or vary over time, and may be organized according to various file formats familiar to those of ordinary skill in the art. In various embodiments, the image recognition logic compares images with one or more maps 222 to identify potential entities in the environment based on a difference in the image when an entity is present, and compares the potential entities to the various definitions 223 to classify the entities. The camera sensor 280 may be activated periodically (i.e., at a scheduled time interval), in response to a radio sensor 260 detecting a previously undetected signal source, in response to a range finder sensor 270 detecting an entity in the environment 100, in response to a camera sensor 280 detecting motion, in response to a command or request received from another AP 110 or a controller 120, and combinations thereof.

The camera sensor 280, in conjunction with the range finder sensor 270 and the profiles 224 for the various entities, provides the ability for a constellation of APs 110 to uniquely track entities throughout an environment 100. Although a camera sensor 280 may use video data to determine whether an entity is moving towards or away from the camera sensor 280, video alone cannot determine how close that entity is to the camera sensor 280. The range finder sensor 270 therefore supplements the video data with range data for the entities identified in the video data to determine how far the entities are from one or more APs 110 in the constellation. The range finder sensors 270 also augment the radio sensors 260 of the constellation to determine wireless connectivity coverage in the constellation via the profiles 224. Although radio sensors 270 may determine distances and coverage requirements (e.g., bandwidth, device limits) for various wireless devices in the environment 100, without augmentation from the range finder sensors 270, the radio sensors 270 may not identify entities that are not currently transmitting wireless signals or that are not transmitting the appropriate data. The range finder sensors 270 in the constellation therefore provide additional data that may be used to build and maintain profiles 224 for entities in the environment 100 that would otherwise be unavailable or expensive in terms of computational power and bandwidth to ascertain.

As various entities move throughout the environment 100, the profiles 224 and multiple angles of observation (from multiple APs 110) allow entities that are "clumped" together or that obscure one another from a give Point of View (POV) to be maintained as distinct entities or to be cross-associated. For example, if two persons walk by each other, a single POV may show one person obscuring the other, which may result in confusion of the entities and signals or other characteristics associated with those entities being confused. By observing the example persons from multiple POVs and associating unique profiles 224 with each person, a constellation of APs 110 may maintain each person as a separate entity for purposes of tracking and share that determination across individual APs 110 within the constellation. In another example, a forklift in a warehouse may be observed with a first set of entities (e.g., various pallets of goods) from a single POV, while from another POV may be observed with a second set of entities (e.g., various pallets of goods, whose members may differ from the members of the first set). By observing the example forklift from multiple POVs, and across time in a profile 224, a third set of entities may be associated with the forklift that more reliably reflects the entities associated with the forklift (e.g., the intersection of the first set and the second set across at least two times).

The example computing device 200 may also include a positioning system 290, which may include a Global Positioning System (GPS) receiver or similar system to establish an absolute position of the computing device 200 in the environment 100, and may include an accelerometer or gyroscope to determine an acceleration (movement) and/or orientation of the computing device 200.

As will be appreciated, a controller 120 may include all or a portion of the components of the example computing device 200, as a controller 120 may be a designated AP 110 in various embodiments. In other embodiments, a controller 120 may be a computing device 200 that includes a processor 210, a memory 220, a network interface 230, (optionally) LEDs 240, and a power supply 250, and may optionally include (and optionally activate/deactivate) one or more of the other components discussed in relation to an AP 110 in FIG. 2.

Figure 3:
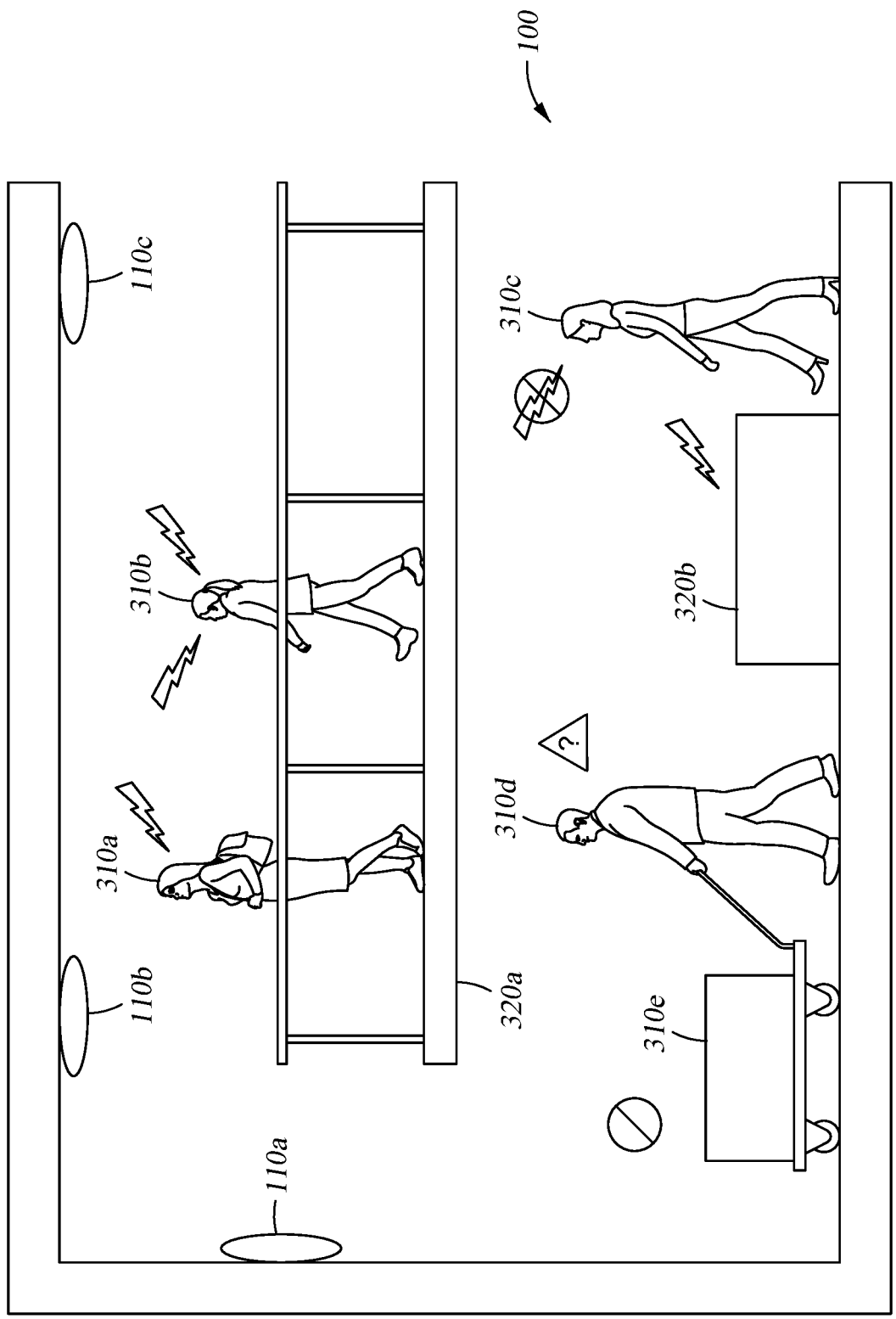
FIG. 3 illustrates an example environment in a profile view, showing several entities within the environment according aspects of the present disclosure.

FIG. 3 illustrates an example environment 100 in a profile view, showing several entities within the environment 100. Although three APs 110a-c, five mobile objects 310a-e (generally, mobile object 310), and two static objects 320a-b (generally, static object 320) are shown, more or fewer of each element may be present in an environment 100.

Generally, entities may be classified into mobile objects 310 or static objects 320, although a mobile object 310 may remain stationary and a static object 320 may be moved. For example, an AP 110 may use the camera sensor 280 to classify a person as a mobile object 310, despite that person remaining in one location for a long period of time. Conversely, an AP 110 may use camera sensors 280 to classify a sofa as a static object 320, despite the sofa being moved from one location to another. The classification of an entity as one of a mobile object 310 or a static object 320 may change over the course of time, and the classification reflects a determined likelihood of the object moving locations within a given time frame.

The camera sensor 280 may use various video and/or image processing techniques to identify entities in a video or an image of the environment 100 and classify that entity according to one or more entity definitions 223. For example, the camera sensors 280 may identify an entity by a classification of the associated shapes, sizes, and/or colors of the image via one or more definitions 223 as a person, a robot, a vehicle, furniture, goods, a plant, an architectural feature, an AP 110, or the like. The camera sensor 280 may mask or otherwise exclude from image processing any entity identified as reflective (e.g., mirrors, windows, floors) so that reflections are not classified as distinct entities. In other embodiments, the camera sensor 280 identifies reflections and associates the reflections with an entity to provide additional visual data regarding that entity (e.g., a second side of a person identified in an image).

Individual mobile objects 310 may be further classified via a radio sensor 260 based on observed signals and definitions associated with the mobile objects. In the illustrated example, the radio sensors 260 may classify the first mobile object 310a as a single signal source object based on the entity being associated with one signal (e.g., a person with a cell phone using wireless connectivity with one of the APs 110, a box with an RFID tag in the presence of an RFID detector). In the illustrated example, the radio sensors 260 may classify the second mobile object 310b as a multiple signal source object based on the entity being associated with several signals (e.g., a person carrying two cell phones using wireless connectivity with one or more of the APs 110, a shipping pallet with several RFID tags in the presence of an RFID detector). In the illustrated example, the radio sensors 260 may classify the third mobile object 310c as a former signal source object based on the entity previously being associated with at least one signal (e.g., a person having a cell phone that has wireless connectivity disabled, a shipping pallet from which RFID tagged objects have been removed). In the illustrated example, the radio sensors 260 may classify the fourth mobile object 310d as a candidate signal source object based on the entity not having been associated yet with at least one signal (e.g., a person having a cell phone in a disabled mode, a shipping pallet that has been identified but not scanned via an RFID detector). Each of the foregoing examples may be collectively referred to as a signaling source, and may be associated with a definition 223 for an entity that generates or is associated with a wireless signal.

In contrast to signaling source objects, various mobile objects 310 may be classified as silent objects based on a definition 223 satisfied for the entity that identifies the object as not generating or being associated with a wireless signal. In the illustrated example, the radio sensors 260 and the cameras 280 may classify a fifth mobile object 310e of luggage or a wagon may be classified as a silent mobile object 310 as the definitions 223 satisfied for the identified object are not associated with the generation of signals. Other examples of mobile objects 310 that may be classified as silent include: animals, vehicles, parcels, young children, and the like.

The processor 210 of one or more APs 110 may associate various mobile objects 310 with one another in one or more profiles 224. Two or more entities may share combined profiles 224 or may be referenced (e.g., via a hyperlink or pointer) in each others' profiles 224 if so associated. For example, a person may be associated with a cellphone based on proximity between the person and the cellphone, and the cellphone may be incorporated into the person's profile 224. In another example, a piece of luggage may be associated with a first person and may be re-associated with a second person at a later time (e.g., when a first person gives luggage to the second person to carry, when the luggage was erroneously first associated with the first person), and the profiles 224 for the luggage, first person, and second person may reference one another to indicate the relationship between the luggage and the various persons. In a further example, a first entity may remain associated with a second entity despite a later introduced distance between the two entities (e.g., a child may be associated with a given adult based on proximity and may remain associated with that adult to aid in tracking family units).

Static objects 320 may be further classified into emitting static objects and non-emitting static objects based on whether the static object 320 in question can be associated with a signal source. The static objects 320 may include various APs 110, architectural features, furniture, signage, and semi-permanent entities in the environment 100 (e.g., kiosks or carts that a "parked" at a particular location for an extended period of time). In the illustrated example, a first static object 320a is shown as a balcony or observation deck—an architectural feature in the environment 100—that is not associated with a signal source, and a camera sensor 280 and radio sensor 260 may therefore classify the first static object 320a as a non-emitting object. In contrast, the camera sensor 280 and radio sensor 260 may classify a second static object 320b of an RFID activator (which broadcasts a signal to activate nearby RFID tags) as an emitting static object.

Figure 4:
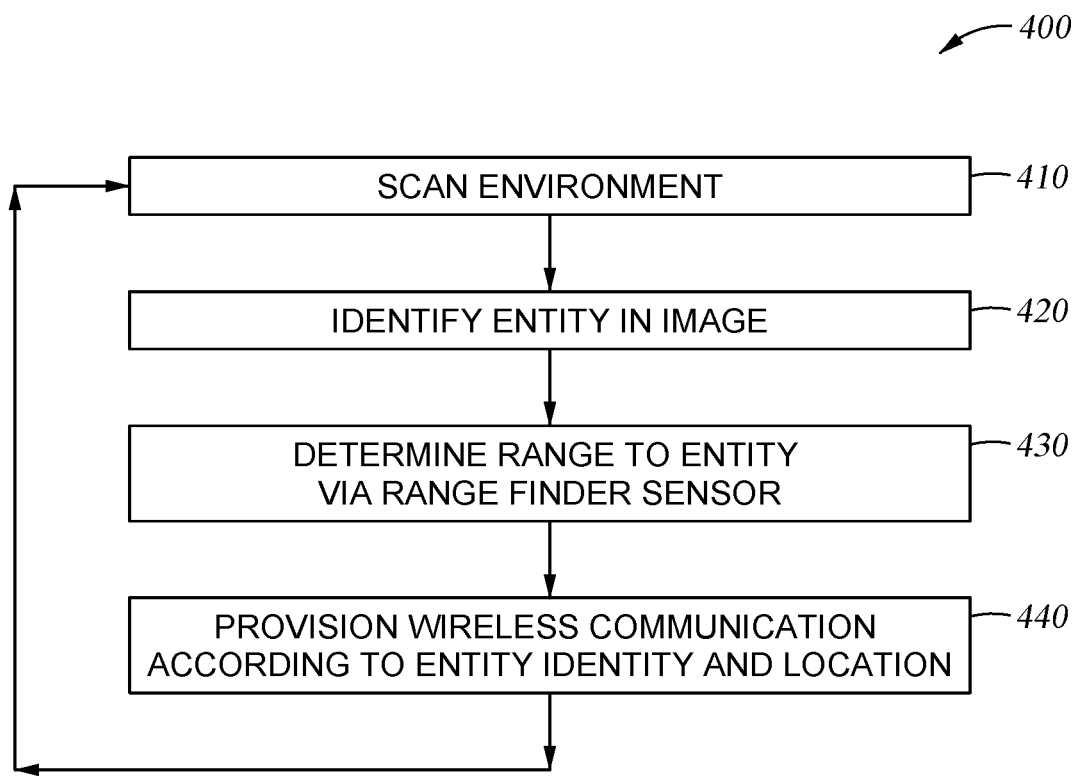
FIG. 4 is a flowchart illustrating general operations of a method for using Access Points with range finding, imaging, and radio functionality to provision wireless communications within an environment according to aspects of the present disclosure.

FIG. 4 is a flowchart illustrating general operations of a method 400 for using APs 110 with range finding, imaging, and radio functionality to provision wireless communications within an environment 100.

Method 400 begins at block 410, where a constellation of APs 110 scans the environment 100 with the sensors included in the APs 110. For example, camera sensors 280 of the equipped APs 110 may take one or more images of the environment 100 and range finder sensors 270 may determine ranges to various objects in the environment. The scan may be initiated for one set of sensors or multiple sets of sensors. In one example, a set of range finder sensors 270 and a set of camera sensors 280 activate every s seconds. In another example, camera sensors 280 activate every s seconds, and the range finder sensors 270 activate in response to a determination from the camera sensors 280 that a mobile object 310 is present in the viewing range of the camera sensor 280. In a further example, a first AP 110a requests the activation of the range finer sensors 270 and the camera sensors 280 of a second AP 110b to thereby receive data from a second POV.

At block 420, sensors identify entities from the scan. In some embodiments, the camera sensor(s) 280 identify an entity in the image(s) captured during the scan of the environment 100. It other embodiments, the range finder sensors(s) 270 identify and entity from range data captured during the scan of the environment 100. The processor 210 uses the images and/or ranges in association with various entity definitions 223 and/or profiles 224 at the individual APs 110 or a controller 120 to identify entities present in the environment 100 based on the appearances of the entities.

At block 430, range finder sensors 270 determine ranges to the entities in the environment 100. In various embodiments, a plurality of range finder sensors 270 provide a three-dimensional mapping of the environment 100, which the processor 210 may use to identify various entities against an initial map 222 of the environment based on shape definitions 223 defined for various entities. These range-identified entities may be used by the processor 210 instead of or in combination with image-identified entities to form a composite identity for an individual entity. When several ranges to a given entity are determined, the range sensor 270 may select one range to represent the range of the given entity in a profile 224 associated with that entity. For example, a center of mass/volume, a "head" or other identified feature of an entity, or a combination thereof (e.g., a center point of a "head") may be used as a representative range to an entity for which multiple ranges have been established. The range sensors 270 may use one or more definitions 223 to determine which portion of an entity to determine a range to.

At block 440, the various processors 210 within the constellation provision wireless communication to the entities in the environment 100 according to the determined identities and locations of entities in the environment 100. Once an entity in the environment is identified as such (per block 420) and multiple ranges to that entity are determined from known locations (per block 430), a processor 210 may establish a location for the entity in the environment 100. The processor 210 may use LiDAR range finder sensors 270 that are part of APs 110 with known positions in the environment 100 to triangulate a location for an entity, or the range finder sensors 270 may establish radii based on the range to the entity from associated APs 110 and the processor 210 may establish the entity's location based on an intersection of two or more radii.

The processors 210 and radios of the APs 110 within the constellation provision wireless communication to the entity based on several factors, including: a type of the entity identified, a likelihood of the entity requesting a wireless communications session, current wireless communication session loads within the constellation, proximities between various entities and APs 110, and whether the entity has a currently established wireless communications session with an AP 110 in the constellation. For example, where one or more of the APs 110 have identified an entity classified as a candidate signal source object, the AP 110 closest to the entity in the environment may pre-allocate a connection for the entity on the AP 110 as part of provisioning wireless communications for the entity. In a second example, in response to determining that the entity is a former signal source object, (e.g., based a prior wireless connection with an AP 110 in the constellation), the AP 110 closest to the entity in the environment 100 pre-allocates a new wireless connection for the entity as part of provisioning wireless communications. In a third example, provisioning wireless communications entails handing over existing wireless connections between two or more APs 110 to balance a number of entities served by those APs 110 or to balance network demand from the entities between the APs 110.

Method 400 may conclude after block 440 or may return to block 410 to initiate a next scan of the environment 100 to thereby build upon the profiles 224 created or updated in prior scans.

FIGS. 5A-D illustrate various views of a scene 500a-d (generally, scene 500) of an environment 100 that may be seen in an embodiment of the present disclosure by a constellation of APs 110.

Figure 5A:
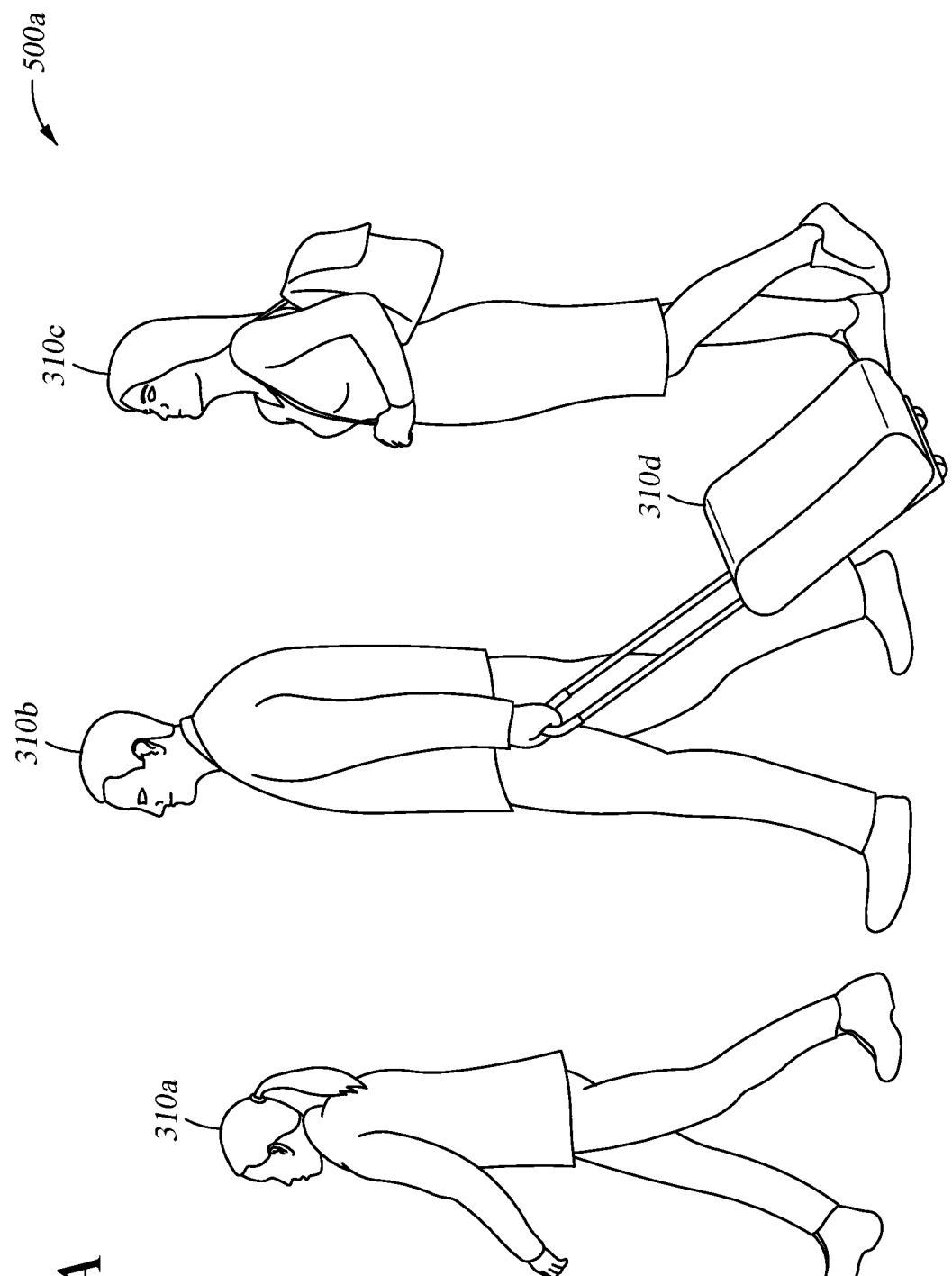
FIGS. 5A-D illustrate various views of a scene of an environment that may be seen by a constellation of Access Points according to aspects of the present disclosure.

A first scene 500a, illustrated in FIG. 5A, shows several mobile objects 310 as may be seen in an image captured by a camera sensor 280 associated with a first AP 110a. Although four mobile objects 310a-d are shown in FIG. 5A more or fewer mobile objects 310 and more static objects 320 may be present in images captured in other examples. FIG. 5A illustrates the first scene 500a from the POV of the first AP 110a, and other APs 110 that are associated with other POVs may be used in conjunction with the first AP 110a and the associated first POV to supplement the identification and tracking of the various entities that are (correctly or incorrectly) identified by the first AP 110.

Figure 5B:
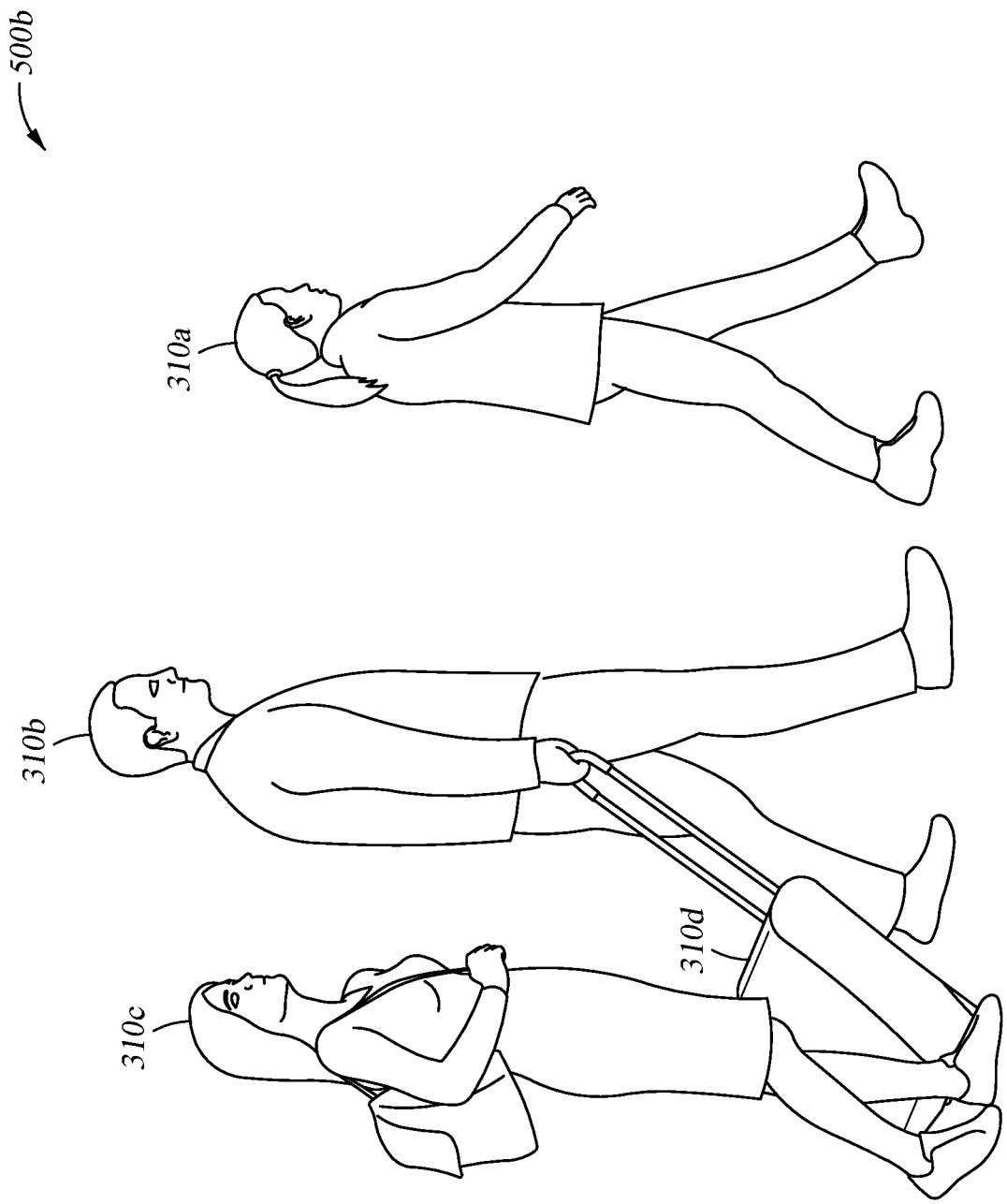

FIG. 5B illustrates a second scene 500b, which may correspond to a different POV of the mobile objects 310 discussed in relation to FIG. 5A from a different angle, such as via a second AP 110b including a camera sensor 280. Entities that are not identified by the camera sensor 280 may also be present in the image. For example, a camera sensor 280 associated with the second AP 110b may have an obstructed view of an entity. In the illustrated scene 500b, the fourth mobile object 310d identified by the first AP 110a is obstructed by the third mobile object 310c, and the second AP 110b, in some instances, may not identify the fourth mobile object 310d as a separate entity (e.g., identifying the fourth mobile object 310d as part of the third mobile object 310c, or leaving the fourth mobile object 310d unidentified). The second AP 110b may therefore supplement the image received from the associated camera sensor 280 with the image and profiles 224 developed by the first AP 110a discussed in relation to FIG. 5A and the first scene 500a to correctly identify the fourth mobile object 310d in the second scene 500b.

Figure 5C:
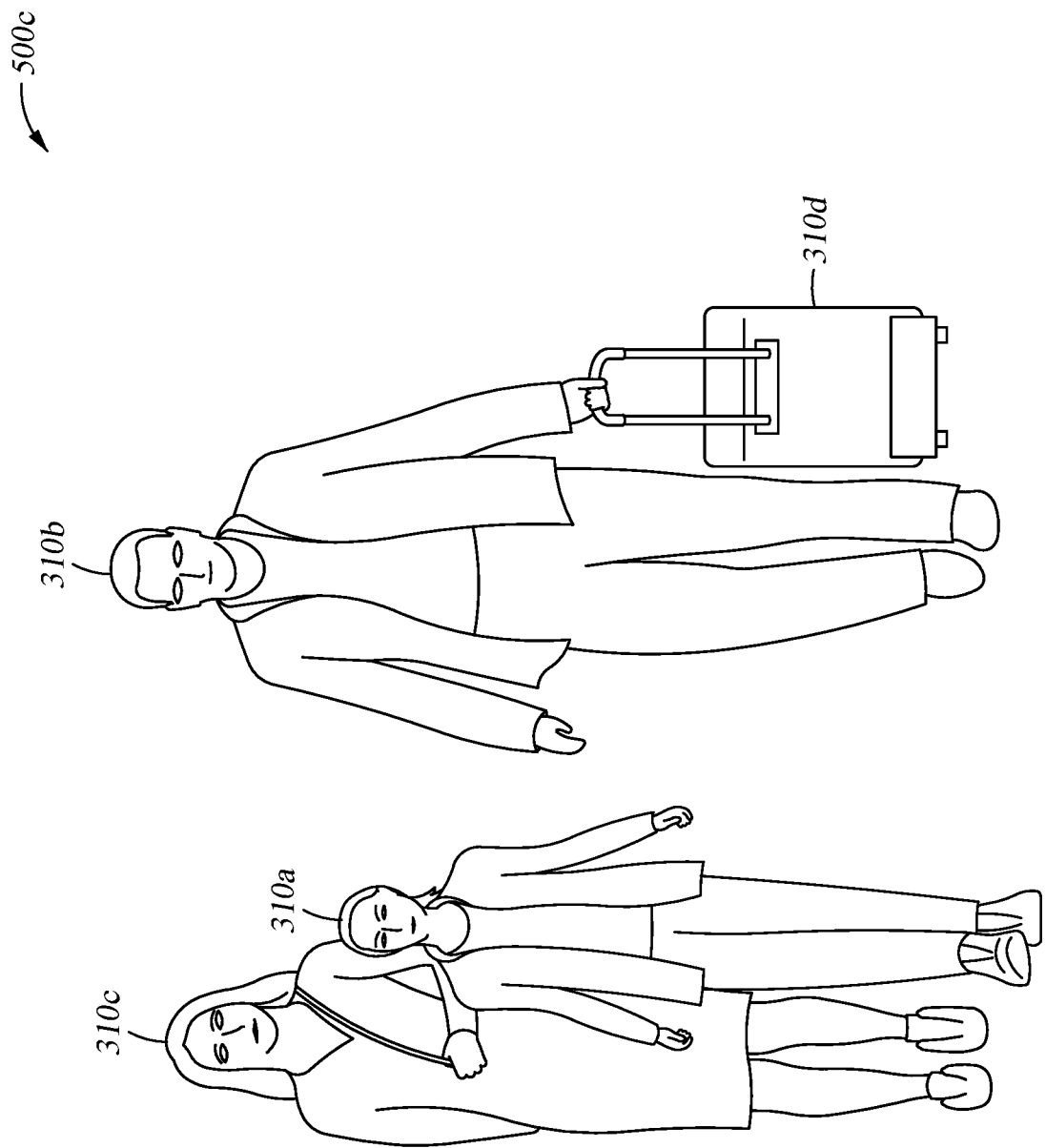

FIG. 5C illustrates a third scene 500c from a third POV different from the POVs shown in the first scene 500a and the second scene 500b, as may be captured via a camera sensor 280 of a third AP 110c in a constellation including the first AP 110a and the second AP 110b. The third POV shown in the third scene 500c is a rotated view (by approximately 90°) from the first scene 500a and the second scene 500b. In various embodiments, the constellation is deployed such that various pre-identified points in the environment 100 include several APs 110 with orthogonal lines of sight to those points. For example, an entrance to an environment 100 may be pre-identified as a point of interest, and several camera sensors 280 are therefore focused on that point from several different angles.

Several APs 110 in an environment 100 may share data amongst one another (directly or indirectly via a controller 120) including: images captured by camera sensors 280, identified entities in the images, and/or profiles 224 of the identified entities. Additionally, APs 110 within a constellation may share determined ranges (e.g., via range finder sensors 270), determined distances (e.g., via radio sensors 260), and positional information (e.g., where in the environment 100 the AP 110 that determined the range or distance is located) with one another, either directly or through a controller 120. Moreover, a given AP 110 may also share data related to which entities are currently served a wireless connection (or have a wireless connection reserved), performance data for the given AP 110, and the like.

APs 110 within a constellation that share a portion of the gathered environmental data with one another are able to build a more coherent understanding of the environment 100 and the entities within the environment 100. For example, by sharing imaging and ranging of the first, second, and third scenes 500a-c among a corresponding first, second, and third AP 110a-c, the individual APs 110 may confirm and/or expand the understanding of the environment 100 for a given AP 110. The number of APs 110 within a constellation that share data, and what data are shared, may vary in different embodiments from the examples given herein.

To illustrate, consider the fourth mobile entity 310d in each of the scenes 500a-c. The first AP 110a and third AP 110c may correctly identify the fourth mobile entity 310d, whereas the second AP 110b may not identify (or mis-identify) the fourth mobile entity 310d without data from the first AP 110a and the third AP 110c. Similarly, the first AP 110a and the second AP 110b may mis-associate (or not associate) the fourth mobile entity 310d with the person moving the fourth mobile entity 310d (i.e., the second mobile entity 310b) without data from the third AP 110c showing a different POV that more clearly shows within person is moving the fourth mobile entity 310d.

Figure 5D:
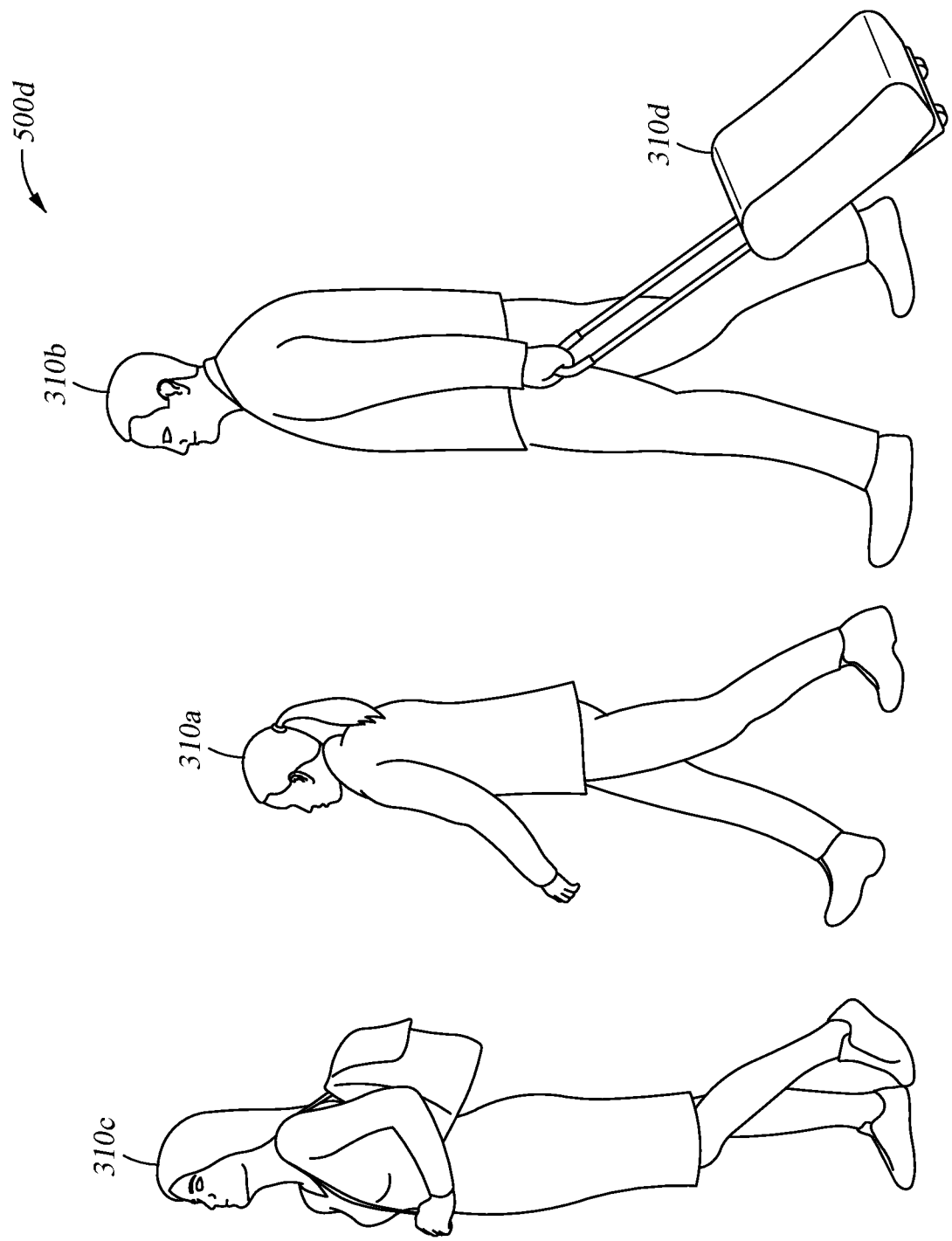

FIG. 5D illustrates a fourth scene 500d from the first POV (a POV shared with the first scene 500a of FIG. 5A) at a different time than that illustrated in FIG. 5A. In FIG. 5D, the third mobile object 310c has moved from behind/to the right of the other entities to an unobstructed position to the left of the other entities. The processors 210 of the APs 110 may update the profiles 224 for the various entities over time to expand or improve the profile 224 of a given entity. In the current example, once the legs of the third mobile object 310c are no longer obscured by the fourth mobile object 310d, additional information related to the third mobile object 310c may be added to an associated profile 224 (e.g., type/color of legwear).

Additionally, associations between the third mobile object 310c and the other entities may be established, strengthened, weakened, or deleted over time. For example, if the first AP 110 was unsure of whether the fourth mobile entity 310d should be associated with the second mobile object 310b or the third mobile object 310c at a time associated with the first scene 500a, and not uncertain (or less uncertain) at a later time associated with the fourth scene 500d, the creation of an association may be delayed until the later time. Similarly, if the first AP 110a had associated the fourth mobile object 310d with the third mobile object 310c at the earlier time, the associated profiles 224 and associations may be updated at the later time when the first AP 110a has made more observations regarding the entities.

Additionally, several observations regarding the entities may be stored by the APs 110 across time (or designated periods of time) for the entities so as to produce vectors of the characteristics, locations, speeds, and associations between entities, signaling characteristics, and confidences thereof for each entity identified in the environment 100. These vectors may be used by APs 110 within the constellation to track locations for each entity over time and predict destinations for the entities (based on heading and speed) to help entities navigate the environment 100 and/or to alert entities of particular spaces in the environment 100 that are of particular interest or that have restricted access. In another embodiment, the vectors may be used by the APs 110 within the constellation to pre-actively manage wireless connectively with the entities; reserving connection capacity on APs 110 expected to receive an influx of entities, handing over existing connections between APs 110, balancing loads between APs 110, etc.

Figure 6:
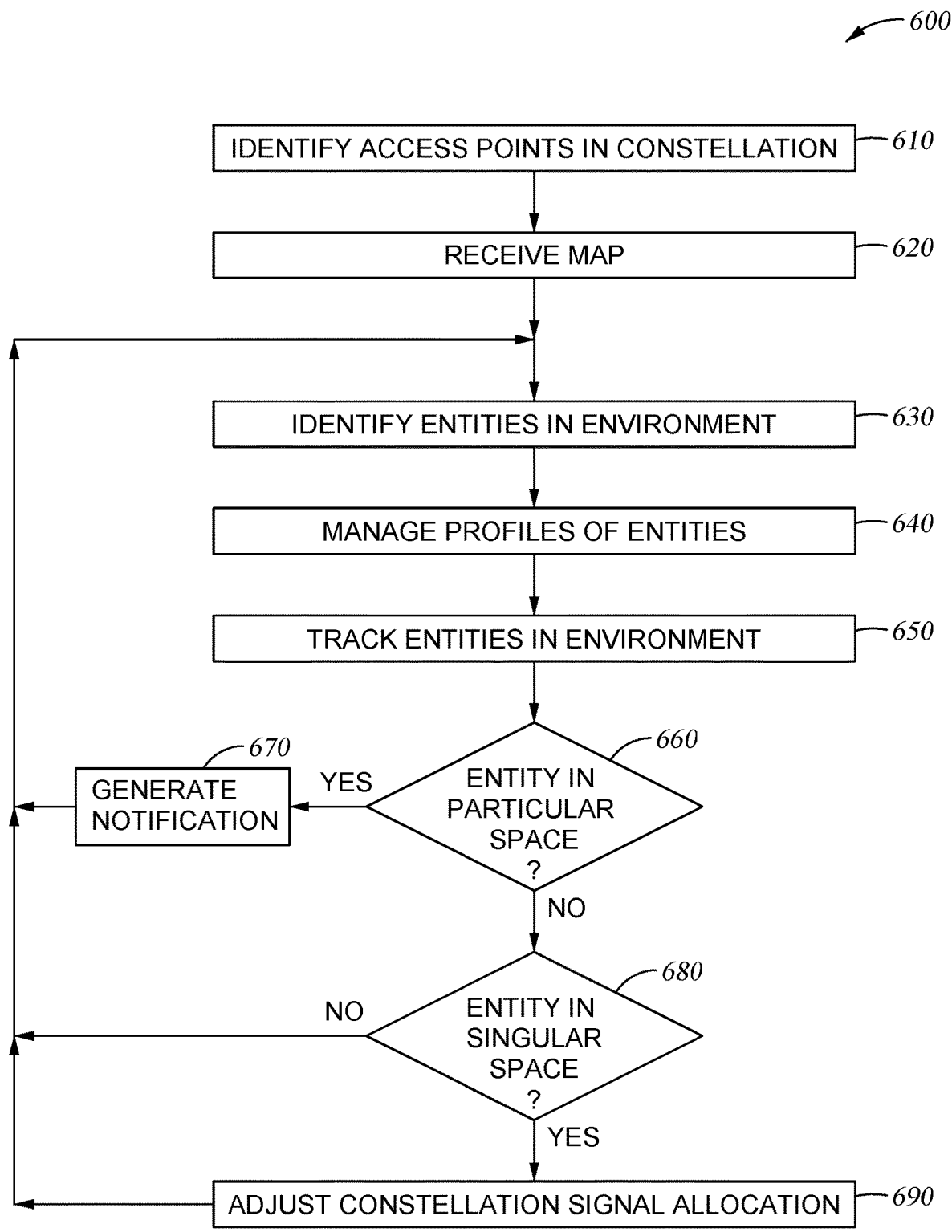
FIG. 6 is a flowchart illustrated general operations of a method for real-time object tracking according to aspects of the present disclosure.

FIG. 6 is a flowchart illustrating general operations of a method 600 for real-time object tracking. Method 600 begins at block 610, where APs 110 in a constellation are identified. In various embodiments, identifying APS within a constellation includes identifying which APs 110 have overlapping wireless service ranges, which APs 110 are within a given proximity to one another, which APs 110 have different POVs of a given space in an environment 100, the capabilities of the various sensors of the APs 110, whether a given AP 110 belongs to more than one constellation or to a sub-constellation, and the like. The APs 110 in a constellation may self-identify the neighboring APs 110 to determine ad hoc the makeup of the constellation, or may be informed of the makeup of the constellation by an administrative user or a controller 120 that gathers data from the various APs 110 in the constellation.

At block 620, a map 222 of the environment 100 in which the constellation is deployed is received by the APs 110 that make up the constellation or a controller 120 in the constellation. In some embodiments, the processors 210 of the APs 110 (with or without a controller 120) independently develop the map 222 by using range finder sensors 270 and camera sensors 280 to develop an understanding of the static objects 320 that make up the environment 100. In other embodiments, a map 222 of the environment is provided to the APs 110 by an administrator or external device. In further embodiments, a map 222 (whether developed or provided) is updated by the APs 110 by using range finder sensors 270 and camera sensors 280 to refine an understanding of the static objects 320 that make up the environment 100 (e.g., to account for furniture being moved, plants growing, damage/dirt to static objects 320). When developing or refining an understanding of the environment 100 via various sensors, a time period for data gathering may be set so that mobile entities 310 are not present in the environment (e.g., during non-business hours, during a maintenance shutdown).

At block 630 the constellation identifies entities in the environment 100. In various embodiments, the entities that are mobile objects 310 are identified in the environment 100 based on a difference between the map 222 received at block 620 and data gathered by range finder sensors 270 and/or camera sensors 280 of the APs 110 in the constellation. The entities may be further identified based on various visual or spatial characteristics according to various definitions 223, and may be classified as belonging to various classed of entity based on which definitions 223 are satisfied and confidence scores associated with those determinations.

At block 640, the constellation manages profiles 224 of the identified entities. Managing a profile 224 may include creating a new profile 224 for a newly observed entity, or updating an existing profile 224 for an entity based on new and/or more reliable observations. The profiles 224 uniquely identify each entity, associate various devices with the entity (e.g., an RFID tag, a laptop computer, a cellphone) based on observed signals generated by (or in proximity to) the entity as determined by radio sensors 260 of the APs 110 in the constellation.

At block 650, the constellation tracks the entities in the environment 100. The sensors of the various APs 110 in the constellation update and gather additional data for the entities within the environment 100 over time, and the data may be gathered into vectors for analysis. For example, the controller 120 may correlate data analyses and/or sensor readings from different APs 110 in the profiles 224 to develop and maintain vectors of the motions, headings, and wireless signaling needs of the various entities identified in the environment 100. For example, the controller 120 may develop a location vector for a first entity from ranges to a first AP 110a and ranges to a second AP 110b (determined by respective range finder sensors 270) that may be compared over a period of time to more accurately determine a location for an entity over that period of time. For example, a person classified as a mobile entity 310 may fidget, have clothing flex, and various positions on the body selected by a range finder sensor 270 as a range finding point, thus altering the determined range for the person to a given AP 110 despite the person not "moving". Similarly, as a person walks, various range readings to the person from a given AP 110 may be affected by arms swinging, heads bobbing, and clothing rippling. Therefore, the range finder sensor 270 may provide a succession of range readings over a given period of time (e.g., a range vector) so that the processor 210 may determine an average range for an entity to a given AP 110 during a period of time and/or an average direction of travel or heading over a period of time. A controller 120 may use several vectors (from associated APs 110) to further improve an understanding of an entity's location and/or heading. The location of each entity in the environment 100 may thus be tracked over time.

At block 660, the processors 210 of the AP 110 of the constellation determine whether a given entity is in a particular space within the environment 100. In one example, a particular space may be designated as a set of coordinates in the environment 100 for which only particular entities are allowed access (e.g., a maintenance area, a secrecy-protection zone). In another example, a particular space within the environment 100 is designated as a set of coordinates along a navigation route that the given entity is directed towards. The processors 210 update the determined location of the entity in the environment 100 relative to the particular space, and in response to the entity's location corresponding to the coordinates of the particular space, an track with devices— either in the environment or associated with the entity—may be used to provide a notification to the entity that the particular space has been reached.

In response to determining that the given entity is in the particular space at block 660, method 600 proceeds to block 670. Otherwise, method 600 proceeds to block 680.

At block 670, a notification is generated and transmitted for the entity to alert the entity that the particular space has been entered. In one example, the AP 110 that is serving a wireless connection with the entity generates and transmits the notification to the device of the entity that is in communication with the AP 110. In a second example, (e.g., when the entity is not in wireless communication with an AP 110), a controller 120 transmits the notification to a computing device in the environment 100 that is in proximity to the entity (e.g., a monitor associated with an interactive map determined to be X meters away from the entity, a warning siren located in the particular space) to alert the entity that the particular space has been entered.

In various embodiments, the notification may include text or images that indicate the next particular space to navigate to. In some embodiments, the notification may be a command to disable functionality of devices associated with the entity while in the particular space (e.g., disabling a camera or cellular transmitter in a secrecy restricted area). In further embodiments, the notification may be a command to activate various devices in the environment 100 that are not associated with the entity (e.g., turning on lights, activating a warning siren, initiating a camera, activating an AP 110).

At block 680, the processors 210 and radio sensors 260 in the constellation determine whether the entity is a signal source that requires (or may require) a wireless communication session with an AP 110 in the constellation. The entity may be a current signal source (as determined by a radio sensor 260), a former signal source (as indicated in a profile 224 based on a former observation by a radio sensor 260), a likely signal source (as indicated by a definition 223 that the entity satisfies), or an unlikely signal source (as indicated by a definition 223 that the entity satisfies). For example, an entity identified as an unlikely signal source (e.g., a young child, a service animal, an inanimate object) may be satisfy a definition 223 that is not associated with establishing a wireless communications session with an AP 110. In contrast, an entity identified as a likely signal source, despite not yet having been observed generating signals or request a wireless communications session with an AP 110, will have satisfied a definition 223 that is associated with establishing a wireless communication session. For example, an entity may satisfy a definition 223 of a signal source by having signals observed by a radio sensor 260 of an AP 110 or the camera sensor 280 of the AP 110 determining that the entity satisfies a definition 223 of a candidate signal source object (e.g., an adult person carrying a cellphone or laptop computer).

In response to determining that the given entity is a signal source at block 680, method 600 proceeds to block 690. Otherwise, method 600 returns to block 630 to identify further entities in the environment 100 and further observe the entities already identified therein.

At block 690 the processors 210 in the constellation adjust signal allocation between the APs 110 of the constellation to accommodate the entity identified as a signal source. In one example, adjusting signal allocation includes a controller 210 identifying an AP 110 with the best SNR with the entity, and signaling that AP 110 to establish a wireless communication session with the entity. In a second example, adjusting signal allocation includes a controller 120 identifying an AP 110 closest to the entity within the environment, and signaling that AP 110 to reserve a wireless communication session for communication with the entity until such time that the entity requests the session (i.e., pre-allocation). In a third example, adjusting signal allocation includes a first AP 110a handing over an existing communications session between a first entity and the first AP 110a to a second AP 110b so that the first AP 110a may accommodate a new wireless communication session for a new entity and the second AP 110b may continue to provide wireless connectivity for the first entity. In a fourth example, adjusting signal allocation includes a first AP 110a establishing a communications session with the entity and a second AP 110b pre-allocating a connection and readying handover procedures from the first AP 110a in anticipation of the entity entering the service area of the second AP 110b and leaving the service area of the first AP 110a. In a fifth example, adjusting signal allocation includes a controller 120 or AP 110 balancing a number or demand profile (e.g., requested bandwidth) for entities connected between a first AP 110a and a second AP 110b in the constellation.

After the signal allocations between the APs 110 of the constellation are adjusted at block 690, method 600 may return to block 630 to identify further entities in the environment 100 and further observe the entities already identified therein.

Method 600 may conclude or reinitialize in response to a signal to receive a new map 222, a signal to adjust a composition of the constellation, or a command to shut down or restart.

Embodiments of the present disclosure are described with reference to flowchart illustrations and/or block diagrams of methods, apparatuses (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods, and computer program products according to various embodiments. In this regard, each block in the flowchart or block diagrams may represent a module, segment or portion of code, which comprises one or more executable instructions for implementing the specified logical function(s). It should also be noted that, in some other implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
a first Access Point (AP), including:
a first camera sensor, configured to identify an entity via a first image of an environment and a plurality of entity definitions;
a first range finder sensor, configured to determine a range between the entity and the first AP; and
a first radio, configured to establish wireless communication with the entity;
a second AP, including:
a second camera sensor, configured to identify the entity via a second image of the environment and the plurality of entity definitions;
a second range finder sensor, configured to determine a second range between the entity and the second AP; and
a second radio, configured to establish wireless communications with the entity; and
a controller, configured to:
determine a first location of the entity in the environment based on the first range, the second range, a position of the first AP in the environment, and a position of the second AP in the environment; and
in response to identifying from a profile for the entity that neither the first AP nor the second AP are in wireless communication with the entity and that the entity is a candidate signal source object, pre-allocate a wireless communication session with the first AP for the entity according to the identified entity and the first location of the entity in the environment.

2. The system of claim 1, wherein the controller is further configured to:
correlate a plurality of first images and a plurality of first ranges over a period of time to create a first vector;
correlate a plurality of second images and a plurality of second ranges over the period of time to create a second vector; and
track the entity in the environment via the first vector and the second vector.

3. The system of claim 2, wherein the controller is further configured to:
identify a specific space in the environment; and
wirelessly transmit a notification to the entity when the entity is traveling towards the space based on the first vector and the second vector.

4. The system of claim 1, wherein the controller is the first AP.

5. The system of claim 1, wherein the controller is further configured to:
provision the wireless communication of the first AP and the second AP by signaling the first AP to establish a wireless communication session with the entity in response to determining that the entity is not in wireless communication with the first AP.

6. The system of claim 5, wherein when the entity is in wireless communication with a third AP, signaling the first AP to establish the wireless communication session with the entity hands over a pre-existing communication session between the third AP and the entity to the first AP.

7. The system of claim 1, wherein the controller is further configured to:
pre-allocate the wireless communication session for the entity with the first AP to balance a number of connections established with entities between the first AP and the second AP.

8. The system of claim 1, wherein the first radio and second radio are radio sensors;
the first radio is further configured to determine a first distance between the entity and the first AP based on wireless signals between the first radio and the entity;
the second radio is further configured to determine a second distance between the entity and the second AP based on wireless signals between the second radio and the entity; and
the controller is further configured to:
determine a second location of the entity in the environment based on the first distance, the second distance, the position of the first AP in the environment, and the position of the second AP in the environment; and
associate a profile to the entity based on a proximity between the first location and the second location, the profile identifying signals generated by the entity.

9. A method, comprising:
identifying a first Access Point (AP) and a second AP in a constellation within an environment, wherein the first AP is positioned at a first known position in the environment, and wherein the second AP is positioned at a second known position in the environment;
performing image processing to identify an entity in a captured image of the environment based on an entity definition;
receiving, via range finders, a first range between the entity and the first AP and a second range between the entity and the second AP;
determining a first location of the entity in the environment based on the first range, the second range, the first known position, and the second known position;
creating a profile for the entity that includes an entity identifier, the first location of the entity, and indicates whether one of the first AP and the second AP is in wireless communication with the entity; and
in response to the profile indicating that neither the first AP nor the second AP are in wireless communication with the entity and determining, based on the entity definition by which the entity is identified, that the entity is a candidate signal source object, pre-allocating a wireless connection with the first AP for the entity.

10. The method of claim 9, wherein the profile indicates that neither the first AP nor the second AP are in wireless communication with the entity, further comprising:
in response to determining that the entity is a former signal source object, based a prior wireless connection with an AP in the constellation, pre-allocating a new wireless connection with the first AP for the entity.

11. The method of claim 10, wherein pre-allocating the new wireless connection with the first AP for the entity includes, handing over an existing wireless connection between the first AP and a second entity to the second AP.

12. The method of claim 9, wherein the profile indicates that neither the first AP nor the second AP are in wireless communication with the entity, further comprising:
in response to determining that the entity is a silent object, based on the entity definition by which the entity is identified, associating the entity with a second entity that is identified as a signaling object based on a proximity between the silent object and the signaling object.

13. The method of claim 9, wherein the entity is identified as a mobile object based on a difference between the image and a map of the environment.

14. The method of claim 13, wherein the map is updated at a predefined interval.

15. The method of claim 9, further comprising:
triangulating a second location of a signal source in the environment based on a first signal between the first AP and the signal source and a second signal between the second AP and the signal source; and
correlating the signal source with the entity based on a proximity between the first location and the second location.

16. The method of claim 15, further comprising:
triangulating a third location of a second signal source in the environment based on a third signal between the first AP and the second signal source and a fourth signal between the second AP and the second signal source; and
correlating the second signal source with the entity based on a second proximity between the first location and the third location.

17. A first Access Point (AP), comprising:
a radio sensor, configured to establish wireless communications with a signal source and determine a first plurality of distances to the signal source relative to a first known position of the signal source within an environment over a period of time;
a camera sensor, configured to capture sequential images of the environment over the period of time and identify an entity within the sequential images;
a range finder sensor, configured to determine a plurality of ranges to an object within the environment over the period of time, wherein the object is identified as the entity from the sequential images;
a network interface, configured to communicate with a second AP in the environment to receive a second plurality of distances to the signal source relative to a second known position of the second AP within the environment;
a processor; and
a memory, including instructions that when executed by the processor cause the processor to:
determine a location of the entity in the environment based on the first plurality of ranges, the second plurality of ranges, the first known position, and the second known position; and
pre-allocating wireless communication session capacity on the first AP for the entity when a profile for the entity indicates that neither the first AP nor the second AP are in wireless communication with the entity and the entity is identified as a candidate signal source object.

18. The first AP of claim 17, wherein the instructions, when executed by the processor, further cause the processor to:
determine a vector of the entity in the environment based on the first plurality of ranges, the second plurality of ranges, the first known position, and the second known position;
track motion of the entity in the environment based on the vector;
identify a particular space in the environment; and
wirelessly transmit a notification to the entity when the entity is traveling towards the particular space based on the vector.

* * * * *